United States Patent
Lee

(10) Patent No.: US 10,340,541 B2
(45) Date of Patent: Jul. 2, 2019

(54) OPERATION CONTROL METHOD AND SYSTEM OF FUEL CELL

(71) Applicants: Hyundai Motor Company, Seoul (KR); Kia Motors Corporation, Seoul (KR)

(72) Inventor: Hoon Hui Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 136 days.

(21) Appl. No.: 14/929,661

(22) Filed: Nov. 2, 2015

(65) Prior Publication Data

US 2016/0293983 A1   Oct. 6, 2016

(30) Foreign Application Priority Data

Mar. 30, 2015   (KR) .................. 10-2015-0044298

(51) Int. Cl.
| | |
|---|---|
| H01M 8/04828 | (2016.01) |
| H01M 8/04858 | (2016.01) |
| H01M 8/04537 | (2016.01) |
| H01M 8/04701 | (2016.01) |
| H01M 8/04746 | (2016.01) |

(52) U.S. Cl.
CPC ..... *H01M 8/04828* (2013.01); *H01M 8/0488* (2013.01); *H01M 8/0491* (2013.01); *H01M 8/04559* (2013.01); *H01M 8/04708* (2013.01); *H01M 8/04731* (2013.01); *H01M 8/04768* (2013.01); *H01M 8/04835* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 6,936,370 B1 | 8/2005 | Knights et al. | |
| 2002/0119356 A1* | 8/2002 | Shimanuki | H01M 8/04126 429/414 |
| 2006/0263651 A1* | 11/2006 | Fagley | H01M 8/04007 429/413 |

(Continued)

FOREIGN PATENT DOCUMENTS

| | | |
|---|---|---|
| JP | 2002-164069 | 6/2002 |
| JP | 2007-179749 | 7/2007 |

(Continued)

*Primary Examiner* — Wyatt P McConnell
(74) *Attorney, Agent, or Firm* — Mintz Levin Cohn Ferris Glovsky and Popeo, P.C.; Peter F. Corless

(57) ABSTRACT

An operation control method and system of a fuel cell (stack) are provided and extend the operation field of the fuel cell in a fuel cell electric vehicle and ensure power performance in the initial stage of starting of the vehicle. In an operation control method of a fuel cell having improved reverse voltage durability, in which an oxygen evolution catalyst is added to the anode electrode, a cell voltage of the fuel cell during normal operation of the fuel cell is monitored. The monitored cell voltage of the fuel cell is compared with a first setting voltage. When the cell voltage is less than the first setting voltage as the cell voltage decreases, a fuel cell operation control process for increasing the humidity in a cell of the fuel cell is performed.

5 Claims, 4 Drawing Sheets

(56) References Cited

U.S. PATENT DOCUMENTS

2009/0252995 A1\* 10/2009 Eickhoff .......... H01M 8/04037
　　　　　　　　　　　　　　　　　　　　　429/434

FOREIGN PATENT DOCUMENTS

| JP | 2009-16282 | 1/2009 |
|---|---|---|
| JP | 2009-129783 A | 6/2009 |
| JP | 2010-192221 | 9/2010 |
| JP | 4958356 B2 | 6/2012 |
| KR | 10-2014-0098284 A | 8/2014 |

\* cited by examiner

OPERATION CONTROL METHOD AND SYSTEM OF FUEL CELL

CROSS-REFERENCE TO RELATED APPLICATION

This application claims under 35 U.S.C. § 119(a) the benefit of Korean Patent Application No. 10-2015-0044298 filed on Mar. 30, 2015, the entire contents of which are incorporated herein by reference.

BACKGROUND (a) Technical Field

The present invention relates to an operation control method of a fuel cell and more particularly, it relates to an operation control method of a fuel cell, which extends the operation field of the fuel cell in a fuel cell electric vehicle and ensures power performance in the initial stage of starting the vehicle.

(b) Background Art

A fuel cell is a type of power generating device that does not convert chemical energy of a fuel into heat by combustion, but converts the chemical energy into electrical energy by an electrochemical reaction within a stack. Fuel cells are used to provide electric power for a small electric/electronic product, particularly a portable device, as well as provide electric power for industry, household, and vehicle driving. Among the fuel cells, a polymer electrolyte membrane fuel cell (PEMFC) also known as a proton exchange membrane fuel cell is currently used as a power supply source for driving vehicles.

The PEMFC has characteristics of low operating temperature, high efficiency, high current density and output density, short starting time, and rapid response to load change, as compared with the other types of fuel cells. Thus, the PEMFC can be widely used as a power source for vehicles or portable devices.

The PEMFC includes a membrane electrode assembly (MEA) in which catalyst electrode layers causing electrochemical reactions are attached to both sides of a polymer electrolyte membrane through which hydrogen ions move, a gas diffusion layer (GLD) that uniformly distributes reaction gases and transfers generated electrical energy, a gasket and a coupling mechanism for maintaining air-tightness of the reaction gases and coolant and appropriate coupling pressure, and a bipolar plate that moves the reaction gases and the coolant.

A fuel cell system applied to fuel cell electric vehicles includes a fuel cell stack configured to generate electric energy by an electrochemical reaction of reaction gases (e.g., hydrogen as a fuel and oxygen as an oxidizer), a hydrogen supply device configured to supply hydrogen as a fuel to the fuel cell stack, an air supply device configured to supply air including oxygen to the fuel cell stack, a heat and water management system configured to adjust the operation temperature of the fuel cell stack and perform a water managing function, and a fuel cell controller configured to operate the fuel cell system.

In a typical fuel cell system, a hydrogen supply device includes a hydrogen storage (e.g., hydrogen tank), a regulator, a hydrogen pressure control valve, a hydrogen recirculation device, and the like. An air supply device includes an air blower, a humidifier, and the like. A heat and water management system includes a coolant pump, a water tank, a radiator, and the like.

Meanwhile, fuel cells have characteristics that optimum performance appears in the range of specific cell temperature and supply gas relative humidity. For a PEMFC, the operation is possible in a temperature range of 0 to 80° C., but its output performance is limited at an appropriate operation temperature or less. When the fuel cell is used as a power supply source of a vehicle, there is a limitation in satisfying sufficient power performance required in acceleration when the operation temperature is relatively low in the initial stage of starting. Particularly, when remaining formation water exists in a cell of the fuel cell when the vehicle is left after starting of the vehicle is stopped, access of fuel gas (e.g., hydrogen) to a reaction portion of the cell may be limited due to the remaining formation water in the starting of the vehicle.

In particular, when a current output is continuously requested to supply power to the vehicle, a severe load is applied to the cell of the fuel cell, and therefore, performance degradation may occur. When the supply of hydrogen to an anode electrode is deficient, the potential of the anode electrode rapidly increases, and therefore, a specific cell voltage may have a '−' value, that is, a negative value. In other words, a reverse voltage may be generated. Accordingly, in a fuel cell electric vehicle, a fuel cell system and the vehicle are operated in such a manner that a cell of a fuel cell is protected by performing current limitation for artificially limiting an output current when the cell voltage of the fuel cell is less than a setting voltage as the cell voltage is monitored.

FIG. 1 is a flowchart illustrating a conventional process of performing current limitation according to the related art. During normal operation of a fuel cell (e.g., operation without error) (S1), a controller is configured to monitor a cell voltage (S2). When the cell voltage is less than a setting value, current limitation is performed (S3 and S4). This is a control strategy required in terms of securing durability by protecting a cell of the fuel cell. However, the merchantability of a vehicle may deteriorate due to deficiency of power performance of the vehicle in the initial stage of starting, particularly in low temperature starting.

In addition, a process of removing moisture by excessively operating an air blower should be performed to remove removing formation water in the cell after starting of the vehicle is stopped, which causing noise to be generated when the starting of the vehicle is stopped. A developed method in the related art discloses a technique for adding an oxygen evolution catalyst (OEC) (water electrolysis catalyst) to an anode electrode catalyst for a hydrogen oxidation reaction to prevent carbon corrosion of an anode electrode and protect the anode electrode in the generation of a reverse voltage.

However, the addition of the OEC is focused on the security of durability in terms of the material of an electrode. Therefore, there has been proposed no operation control strategy for extending the operation field of a fuel cell or ensuring power performance in the initial stage of starting in a vehicle including the fuel cell with improved reverse voltage durability to which the corresponding electrode is applied.

SUMMARY

The present invention provides an operation control method of a fuel cell, which may extend the operation field of the fuel cell in a fuel cell electric vehicle and ensure power performance in the initial stage of starting of the vehicle.

In one aspect, the present invention provides an operation control method of a fuel cell having improved reverse voltage durability, in which an oxygen evolution catalyst is added to an anode electrode, the operation control method may include: monitoring a cell voltage of the fuel cell during normal operation of the fuel cell; comparing the monitored cell voltage of the fuel cell with a first setting voltage; and when the cell voltage is less than the first setting voltage as the cell voltage drops, performing a fuel cell operation control process for increasing the humidity in a cell of the fuel cell.

In an exemplary embodiment, the first setting voltage may be set as a threshold voltage at which the generation of a reverse voltage is possible. In another exemplary embodiment, the fuel cell operation control process for increasing the humidity in the cell of the fuel cell may be performed as one or both of a fuel cell operation control process for decreasing the temperature of the cell and a fuel cell operation control process for increasing the relative humidity of air supplied to the fuel cell.

In still another exemplary embodiment, when the cell voltage is less than the first setting voltage as the cell voltage decreases, the fuel cell operation control process for decreasing the temperature of the cell may be first performed, and, in response to determining that the cell voltage is continuously decreased, the fuel cell operation control process for increasing the relative humidity of the supplied air may be performed. In addition, when the cell voltage is less than the first setting voltage as the cell voltage decreases, the fuel cell operation control process for decreasing the temperature of the cell and the fuel cell operation control process for increasing the relative humidity of the supplied air may be performed simultaneously.

The operation control method may further include comparing the cell voltage of the fuel cell with a second setting voltage set as a threshold voltage for current limitation during the performance of the fuel cell operation control process for increasing the humidity in the cell of the fuel cell; and when the cell voltage is less than the second setting voltage as the cell voltage drops, current limitation for limiting the output current of the fuel cell is performed.

In a further exemplary embodiment, the fuel cell operation control process for decreasing the temperature of the cell may include increasing the rotational frequency of a coolant pump to increase the flow path of a coolant as compared with that in the normal operation of the fuel cell operated at a cell voltage greater than the first setting voltage or more. In addition, the fuel cell operation control process for increasing the relative humidity of the supplied air may include operating a heater for increasing the temperature of air from an air blower to a humidifier.

According to the operation control method of the present invention, a control process performed to secure moisture in the cell may be additionally performed under an operation condition in which the generation of a reverse voltage is possible during operation of the fuel cell having improved reverse voltage durability (an oxygen evolution catalyst is added to the anode electrode), so that it is possible to extend the operation field of the fuel cell, extend a range of power available in a fuel cell electric vehicle, ensure power performance in the initial stage of starting of the vehicle, and enhance the merchantability of the vehicle.

Further, the operation condition of the fuel cell may be operated to further improve the reverse voltage durability. Thus, it may be possible to improve the durability of the anode electrode of the fuel cell, improve the lifespan of the fuel cell and the vehicle having the same, and improve reliability of the fuel cell as a vehicle power source.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
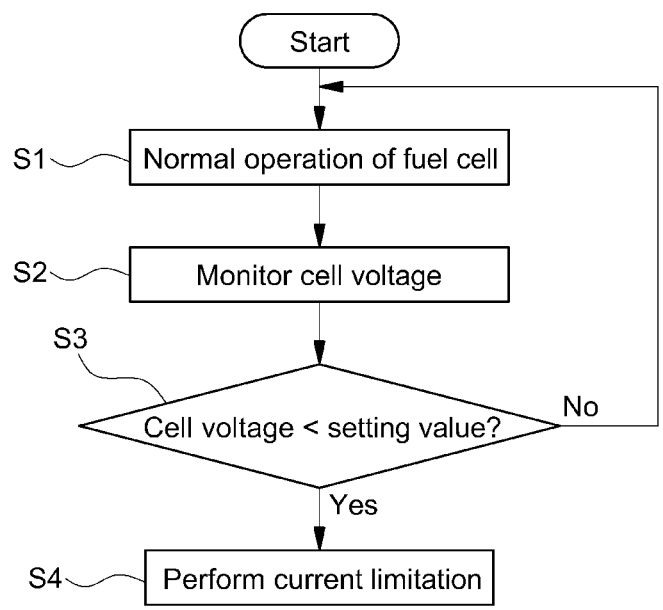
FIG. 1 is a flowchart illustrating a conventional process of performing current limitation according to the related art.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides an operation control method of a fuel cell having improved reverse voltage durability (e.g., an oxygen evolution catalyst is added to an anode electrode), in which when supply of hydrogen is deficient, water existing in the anode electrode may be decomposed, to generate protons and electrons and prevent carbon corrosion of the anode electrode. Particularly, the present invention provides an operation control method of a fuel cell (stack) having improved reverse voltage durability, which may extend the operation field of the fuel cell in a fuel cell electric vehicle and ensure power performance in the initial stage of starting of the vehicle.

First, characteristics of a fuel cell having improved reverse voltage durability will be described before the operation control method of the present invention is described. Characteristics of the fuel cell having improved reverse voltage durability, in which an oxygen evolution catalyst (OEC) (e.g., water electrolysis catalyst) is added to an anode electrode catalyst, will be evaluated. Water having an amount required to satisfy a current load during operation of the fuel cell should be secured.

Figure 2:
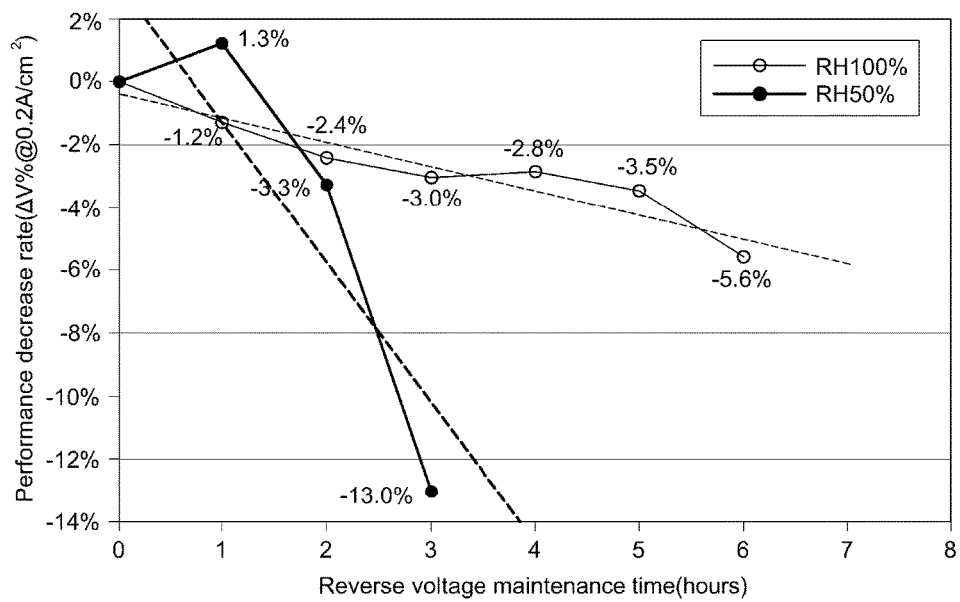
FIGS. 2 and 3 are graphs showing results obtained by evaluating characteristics of a fuel cell having improved reverse voltage durability according to an exemplary embodiment of the present invention.
Figure 3:
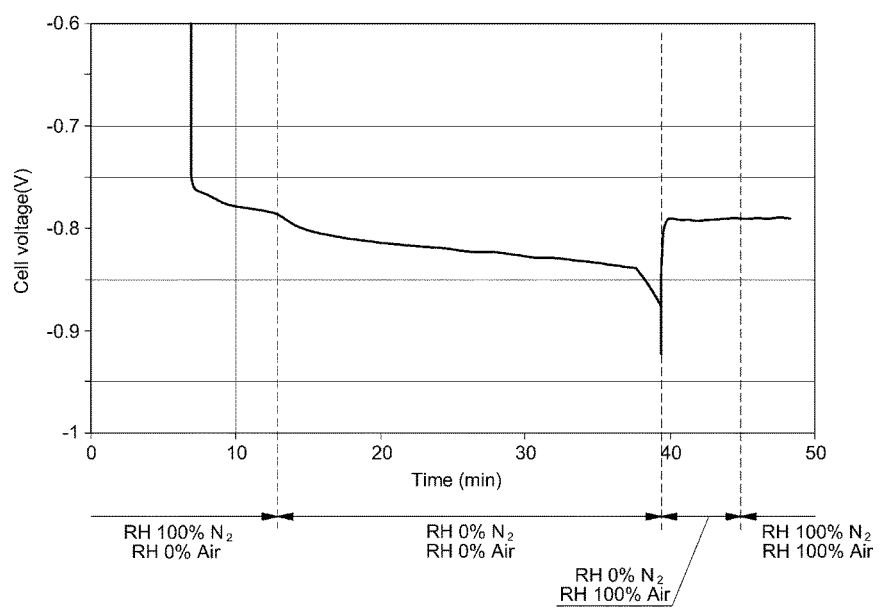

FIGS. 2 and 3 are graphs showing results obtained by evaluating the characteristics of the fuel cell having improved reverse voltage durability. FIG. 2 shows voltage decrease rates (e.g., voltage decrease rates in the generation of reverse voltages as compared with an initial state of normal operation) based on reverse voltage maintenance times when the generation of reverse voltages is simulated under a condition in which about 0.2 A/cm$^2$ as a current value per unit area of the fuel cell is output (e.g., humidified nitrogen gas, instead of hydrogen, is supplied to the anode electrode). Particularly, FIG. 2 comparatively shows states in which reverse voltages are generated based on relative humidities (RHs) of gases supplied to the anode electrode and a cathode electrode.

As shown in FIG. 2, in the fuel cell having improved reverse voltage durability (OEC is added to the anode electrode), the degree of generation of a reverse voltage and the degree of prevention of carbon corrosion change based on relative humidities of the supplied gases. In other words, when the relative humidity RH is 100%, the durability against carbon corrosion is greater than that when the relative humidity RH is 50%.

FIG. 3 shows states of reverse voltages according to relative humidities of nitrogen ($N_2$) and air respectively supplied to the anode and cathode electrodes when the generation of reverse voltages is simulated. Referring to FIG. 3, in the fuel cell having improved reverse voltage durability, when the nitrogen ($N_2$) having a relative humidity of 100% is supplied to the anode electrode and dry air having a relative humidity of 0% (e.g., the air is bypassed without passing through a humidifier, and hereinafter is the same) may be supplied to the cathode electrode, a sudden decrease of cell voltage may occur.

Additionally, when dry nitrogen and dry air each having the relative humidity of 0% are supplied to the anode and cathode electrodes, respectively, a water electrolysis reaction may not be maintained, and therefore, the cell voltage may be further decreased. When the relative humidity of the gas (air) supplied to the cathode electrode increases (nitrogen ($N_2$) of RH 0% and air of RH 100%/$N_2$ of RH 100% and air of RH 100%), the water electrolysis reaction in which protons and electrons are generated by the OEC of the anode electrode may be maintained (e.g., the cell voltage may be maintained).

According to the evaluation results of FIG. 2, in the fuel cell having improved reverse voltage durability, the reverse voltage durability may be further influenced by the humidity of the gas supplied to the cathode electrode rather than the humidity of the gas supplied to the anode electrode (e.g., the cell voltage may be maintained when the air of RH 100% is supplied). In the present invention, an operation control method of a fuel cell having improved reverse voltage durability, which may extend the operation field of the fuel cell and ensure power performance in the initial stage of starting of a vehicle, will be proposed based on the results obtained by evaluating the characteristics of the fuel cell.

First, in the operation control method of the fuel cell according to an exemplary embodiment of the present invention, the operation field of the fuel cell may be extended by decreasing the level of a cell voltage (e.g., current limitation setting voltage, that corresponds to a second setting voltage which will be described later) at which a current limitation mode starts.

For example, in the conventional art, fuel cell (stack) current limitation for cell protection was conventionally performed when the cell voltage is less than 0.6V. In the present invention, when the cell voltage is less than 0.6V (e.g., corresponding to a first setting voltage which will be described later) in the fuel cell having improved reverse voltage durability, the humidity in a cell may be increased to secure moisture required in the water electrolysis reaction, thereby maintaining the operation of the fuel cell without current limitation. Subsequently, when the cell voltage is less than a newly set voltage, e.g., about 0.1V (e.g., corresponding to the second setting voltage which will be described later), the current limitation mode may begin.

Figure 4:
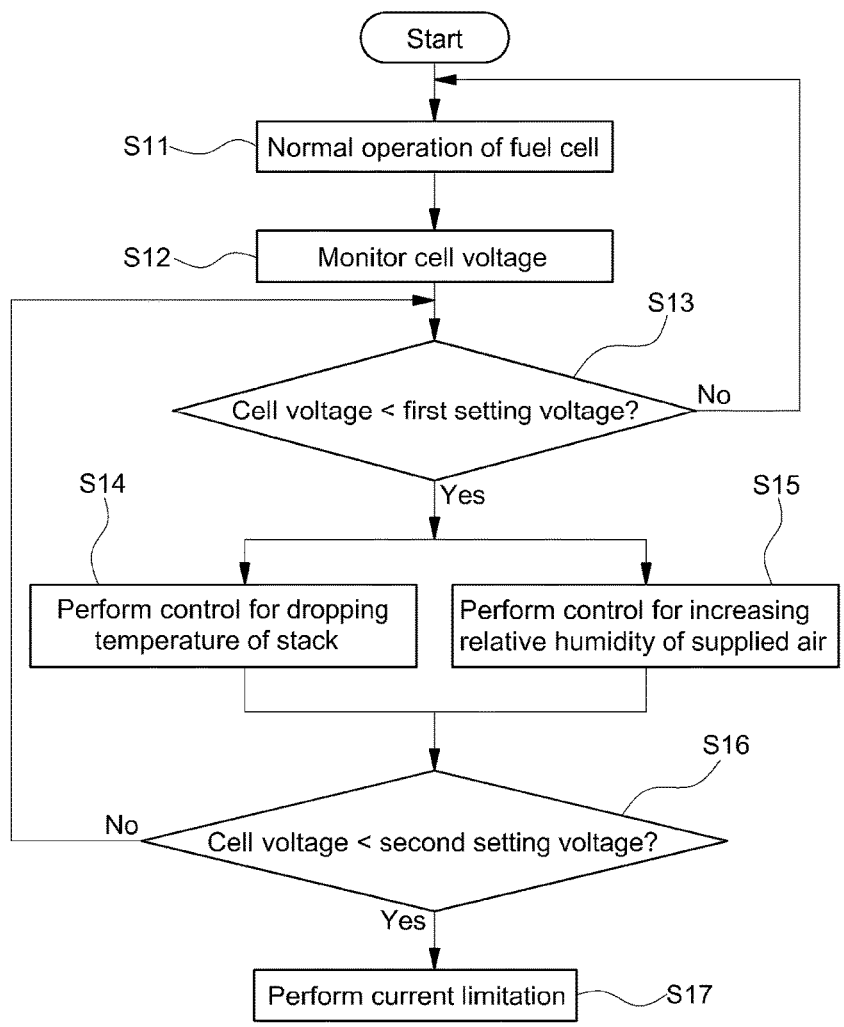
FIG. 4 is a flowchart illustrating an operation control method of a fuel cell according to an embodiment of the present invention.

FIG. 4 is a flowchart illustrating an operation control method of the fuel cell according to an exemplary embodiment of the present invention. The method as described herein below may be executed by a controller having a memory and a processor. First, during normal operation of a fuel cell having improved reverse voltage durability (S11), a controller of the fuel cell may be configured to monitor a cell voltage of the fuel cell using a cell voltage monitoring device (S12).

In particular, the cell voltage may be compared with a first setting voltage (S13). When the cell voltage is less than the first setting voltage, that is, a threshold voltage at which the generation of a reverse voltage is possible, a reverse voltage situation of an anode electrode may occur. Therefore, to secure moisture in a cell, one or both of a fuel cell operation control process (S14) for decreasing the cell temperature of a fuel cell stack and a fuel cell operation control process (S15) for increasing the relative humidity RH of air supplied to the fuel cell stack may be performed.

Accordingly, a method for increasing the flow rate of coolant passing through the fuel cell stack by increasing the rotational frequency of a coolant pump for circulating the coolant in the fuel cell stack may be used as the method for decreasing the cell temperature. In addition, a method for increasing the temperature of air supplied from an air blower to a humidifier using a heater in an air supply line may be used as the method for increasing the relative humidity of air.

In the present invention, both the method for decreasing the cell temperature of the fuel cell stack and the method for increasing the relative humidity of the air supplied to the fuel cell stack may be used to increase the relative humidity in the cell of the fuel cell stack. When the cell voltage is less than the first setting voltage as the cell voltage is decreased during operation of the fuel cell, one of the two methods may be performed, or both the methods may be performed simultaneously.

Particularly, the controller of the fuel cell may be configured to determine that the cell voltage is less than the first setting voltage, and thus may be configured to operate the coolant pump at a rotational frequency set greater than that in the normal operation state, which is the first setting voltage or more, to prevent a reverse voltage. Simultaneously, the controller of the fuel cell may be configured to operate the heater to increase the temperature of the air supplied to the humidifier by the air blower.

Furthermore, control processes for increasing the humidity in the cell may be sequentially performed based on states of the cell voltage. In other words, since the humidity in the cell is more effectively increased by decreasing the temperature of the fuel cell stack, the control process for decreasing the temperature of the fuel cell stack may be performed first. After that, in response to determining that the cell voltage is continuously decreased, an additional control process of increasing the temperature of air supplied to the humidifier by operating the heater may be performed.

Subsequently, in response to determining that the cell voltage is less than a predetermined second setting voltage as the cell voltage is continuously decreased even after the control process for increasing the humidity in the cell of the fuel cell starts, the controller of the fuel cell may be configured to enter a current limitation mode to limit a current output of the fuel cell to a set current limitation value. In the present invention, the current limitation value may be set as a value (e.g., about 0.4 A/cm$^2$) greater than the current limitation value in the conventional art.

As described above, according to the operation control method of the present invention, a control process performed to secure moisture in the cell may be additionally performed under an operation condition in which the generation of a reverse voltage is possible during operation of the fuel cell having improved reverse voltage durability, so that it may be possible to extend the operation field of the fuel cell, extend a range of power available in a fuel cell electric vehicle, ensure power performance in the initial stage of starting of the vehicle, and enhance the merchantability of the vehicle. Further, the operation condition of the fuel cell may be adjusted to further improve the reverse voltage durability. Thus, it may be possible to improve the durability of the anode electrode of the fuel cell, improve the lifespan of the fuel cell and the vehicle having the same, and improve reliability of the fuel cell as a vehicle power source.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An operation control method of a fuel cell having improved reverse voltage durability, in which an oxygen evolution catalyst is added to an anode electrode, the operation control method comprising:
    monitoring, by a controller, a cell voltage of the fuel cell during normal operation of the fuel cell;
    comparing, by the controller, the monitored cell voltage of the fuel cell with a first setting voltage;
    when the cell voltage is less than the first setting voltage as the cell voltage drops, performing, by the controller, a fuel cell operation control process for increasing the humidity in a cell of the fuel cell;
    comparing, by the controller, the cell voltage of the fuel cell with a second setting voltage set as a threshold voltage for current limitation during the performance of the fuel cell operation control process for increasing the humidity in the cell of the fuel cell; and
    when the cell voltage is less than the second setting voltage as the cell voltage decreases, performing, by the controller, current limitation for limiting the output current of the fuel cell,
    wherein the first setting voltage is set as a threshold voltage at which generation of a reverse voltage is possible,
    wherein the fuel cell operation control process for increasing the humidity in the cell includes a fuel cell operation control process for decreasing the temperature of the cell, and a fuel cell operation control process for increasing only a relative humidity of air supplied to a cathode of the fuel cell, and
    wherein when the cell voltage is less than the first setting voltage as the cell voltage decreases, the fuel cell operation control process for decreasing the temperature of the cell is performed first, and, in response to determining that the cell voltage is continuously decreased, the fuel cell operation control process for increasing the relative humidity of the supplied air is performed.

2. The operation control method of claim 1, wherein the fuel cell operation control process for decreasing the temperature of the cell includes:
    increasing, by the controller, the rotational frequency of a coolant pump to increase the flow path of a coolant as compared with that in the normal operation of the fuel cell operated at a cell voltage greater than the first setting voltage or more.

3. The operation control method of claim 1, wherein the fuel cell operation control process for increasing the relative humidity of the supplied air includes:
  operating, by the controller, a heater for increasing the temperature of air from an air blower to a humidifier.

4. An operation control system of a fuel cell having improved reverse voltage durability, in which an oxygen evolution catalyst is added to an anode electrode, the operation control system comprising:
  a memory configured to store program instructions; and
  a processor configured to execute the program instructions, the program instructions when executed configured to:
    monitor a cell voltage of the fuel cell during normal operation of the fuel cell;
    compare the monitored cell voltage of the fuel cell with a first setting voltage; and
    when the cell voltage is less than the first setting voltage as the cell voltage drops perform a fuel cell operation control process for increasing the humidity in a cell of the fuel cell,
    compare the cell voltage of the fuel cell with a second setting voltage set as a threshold voltage for current limitation during the performance of the fuel cell operation control process for increasing the humidity in the cell of the fuel cell, and
    when the cell voltage is less than the second setting voltage as the cell voltage decreases perform current limitation for limiting the output current of the fuel cell,
  wherein the first setting voltage is set as a threshold voltage at which generation of a reverse voltage is possible,
  wherein the fuel cell operation control process for increasing the humidity in the cell includes a fuel cell operation control process for decreasing the temperature of the cell, and a fuel cell operation control process for increasing only a relative humidity of air supplied to a cathode of the fuel cell, and
  wherein when the cell voltage is less than the first setting voltage as the cell voltage decreases, the fuel cell operation control process for decreasing the temperature of the cell is performed first, and, in response to determining that the cell voltage is continuously decreased, the fuel cell operation control process for increasing the relative humidity of the supplied air is performed.

5. A non-transitory computer readable medium containing program instructions executed by a controller, the computer readable medium comprising:
  program instructions that monitor a cell voltage of the fuel cell during normal operation of the fuel cell;
  program instructions that compare the monitored cell voltage of the fuel cell with a first setting voltage; and
  program instructions that perform a fuel cell operation control process for increasing the humidity in a cell of the fuel cell when the cell voltage is less than the first setting voltage as the cell voltage drops;
  program instructions that compare the cell voltage of the fuel cell with a second setting voltage set as a threshold voltage for current limitation during the performance of the fuel cell operation control process for increasing the humidity in the cell of the fuel cell; and
  program instructions that perform current limitation for limiting the output current of the fuel cell when the cell voltage is less than the second setting voltage as the cell voltage decreases,
  wherein the first setting voltage is set as a threshold voltage at which the generation of a reverse voltage is possible,
  wherein the fuel cell operation control process for increasing the humidity in the cell includes a fuel cell operation control process for decreasing the temperature of the cell, and a fuel cell operation control process for increasing only a relative humidity of air supplied to a cathode of the fuel cell, and
  wherein when the cell voltage is less than the first setting voltage as the cell voltage decreases, the fuel cell operation control process for decreasing the temperature of the cell is performed first, and, in response to determining that the cell voltage is continuously decreased, the fuel cell operation control process for increasing the relative humidity of the supplied air is performed.

* * * * *